US008214594B1

(12) United States Patent
Kneisley et al.

(10) Patent No.: US 8,214,594 B1
(45) Date of Patent: Jul. 3, 2012

(54) DYNAMICALLY ALLOCATED SECONDARY BROWSER CACHE

(75) Inventors: Gabriel B. Kneisley, San Francisco, CA (US); Brian Smith, Shawnee, KS (US); Jeff Bryan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/294,790

(22) Filed: Nov. 11, 2011

Related U.S. Application Data

(63) Continuation of application No. 12/212,862, filed on Sep. 18, 2008, now Pat. No. 8,060,697.

(51) Int. Cl.
*G06F 12/00* (2006.01)

(52) U.S. Cl. ........ 711/118; 711/151; 711/156; 711/158; 711/165; 711/170; 707/672; 707/726; 709/226

(58) Field of Classification Search .................. 711/118, 711/151, 156, 158, 165, 170; 707/672, 726; 709/226
See application file for complete search history.

(56) References Cited

U.S. PATENT DOCUMENTS

| 6,272,598 | B1 * | 8/2001 | Arlitt et al. | 711/133 |
| 6,799,248 | B2 * | 9/2004 | Scherr | 711/118 |
| 6,834,329 | B2 * | 12/2004 | Sasaki et al. | 711/134 |
| 7,330,933 | B2 * | 2/2008 | Crick | 711/118 |
| 7,360,042 | B2 * | 4/2008 | Chen et al. | 711/159 |
| 2001/0037400 | A1 * | 11/2001 | Raz et al. | 709/232 |
| 2003/0225885 | A1 * | 12/2003 | Rochberger et al. | 709/226 |
| 2007/0245409 | A1 * | 10/2007 | Harris et al. | 726/5 |

* cited by examiner

*Primary Examiner* — Stephen Elmore

(57) ABSTRACT

A method, system, and medium are provided for managing cache allocation between a primary storage and a secondary storage. The system includes a device with a primary storage, secondary storage, and cache manager. The method includes downloading a web resource, storing the web resource in the primary storage, determining the amount of time required to download the web resource, and determining the amount of time required to retrieve the web resource from the secondary storage. If the amount of time required to retrieve the web resource from the secondary storage is less than the amount of time required to download the web resource, the method stores the web resource in the secondary storage. Additionally, web resources may be moved from the secondary storage to the primary storage based on their likelihood of being utilized.

20 Claims, 3 Drawing Sheets

DYNAMICALLY ALLOCATED SECONDARY BROWSER CACHE

CROSS-REFERENCE TO RELATED APPLICATIONS

This application is a continuation of U.S. application Ser. No. 12/212,862, filed Sep. 18, 2008, now U.S. Pat. No. 8,060,697, titled "DYNAMICALLY ALLOCATED SECONDARY BROWSER CACHE," and which is incorporated herein by reference.

BACKGROUND

A variety of devices have been developed that allow users to browse the Internet and/or other network resources on a remote device, typically a server. For example, a user can browse the Internet on their cellular phone. One of skill in the art will appreciate that for a user to browse a web page, web resources for that web page must be downloaded to the user's device. Web resources, as referred to herein, are the data files that compose a web page and may include text files, graphics files, audio files, and video files. Typically, a web browser's cache stores the web resources that have been downloaded as a result of a user's recently accessed web pages in a fixed file in a pre-defined location. These cached web resources are stored in a manner such that as the web browser's cache becomes full, web resources are removed from the file in a first in, first out (FIFO) manner or at the time at which they have been set to expire. Rather than simply purging web resources as the web browser's cache becomes full and requiring the web resources be downloaded again when the user returns to a previously viewed web page, it is desirable to be able to utilize additional storage space on a device for cache allocation.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a method is presented for managing cache between a primary storage and a secondary storage on a device. A first web resource that is stored in the primary storage is moved to the secondary storage, based on a comparison between the amount of time required to download the first web resource, and the amount of time required to retrieve the first web resource from the secondary storage. A second web resource stored in the secondary storage is deleted, based on a comparison between the amount of time required to download the second web resource, and the amount of time required to download the first web resource.

In a second aspect, one or more computer-storage media are provided, having computer-usable instructions embodied thereon that, when executed, perform a method for managing cache between a primary storage and a secondary storage on a mobile device. A first web resource is selected to be deleted from the primary storage. A determination is made as to whether storage space is available in the secondary storage for the first web resource. When storage space is available, then the first web resource is stored in the secondary storage. When storage space is not available in the secondary storage, then a second web resource is deleted from the secondary storage to make storage space available in the secondary storage for the first web resource, The first web resource is stored in the secondary storage and deleted from the primary storage.

In a third aspect, a method is presented for managing cache between a primary storage and a secondary storage on a mobile device. A determination is made as to whether a first web resource stored in the secondary storage has a likelihood of being utilized. When the first web resource has a likelihood of being utilized, then the first web resource is moved from the secondary storage to the primary storage. The primary storage is prevented from filling up by removing a second web resource from the primary storage, where removing the second web resource includes determining whether the second web resource has expired, and when the second web resource has expired, then deleting the second web resource, and when the second web resource has not expired, then moving the second web resource to the secondary storage.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for managing cache between a primary storage and a secondary storage. A cache manager on a device may implement the systems and methods described below to manage web resource allocation. By managing web resource allocation between a primary storage and a secondary storage, the cache manager may make use of additional space on a device to store web resources and speed up browsing. In an exemplary embodiment, the cache manager is implemented on a mobile device utilizing a removable mass storage unit as the secondary storage in addition to a non-removable device memory as the primary storage to store web resources and ultimately speed up mobile browsing. The removable mass storage unit may have a large data capacity but a slow read/write speed. The non-removable device memory may have a small data capacity but a fast read/write speed. Web resources, as defined herein, may include any network resource remotely downloaded to a device as in the case of browsing the Internet or an intranet. Some of the wording and form of description is done so herein to meet applicable statutory requirements. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
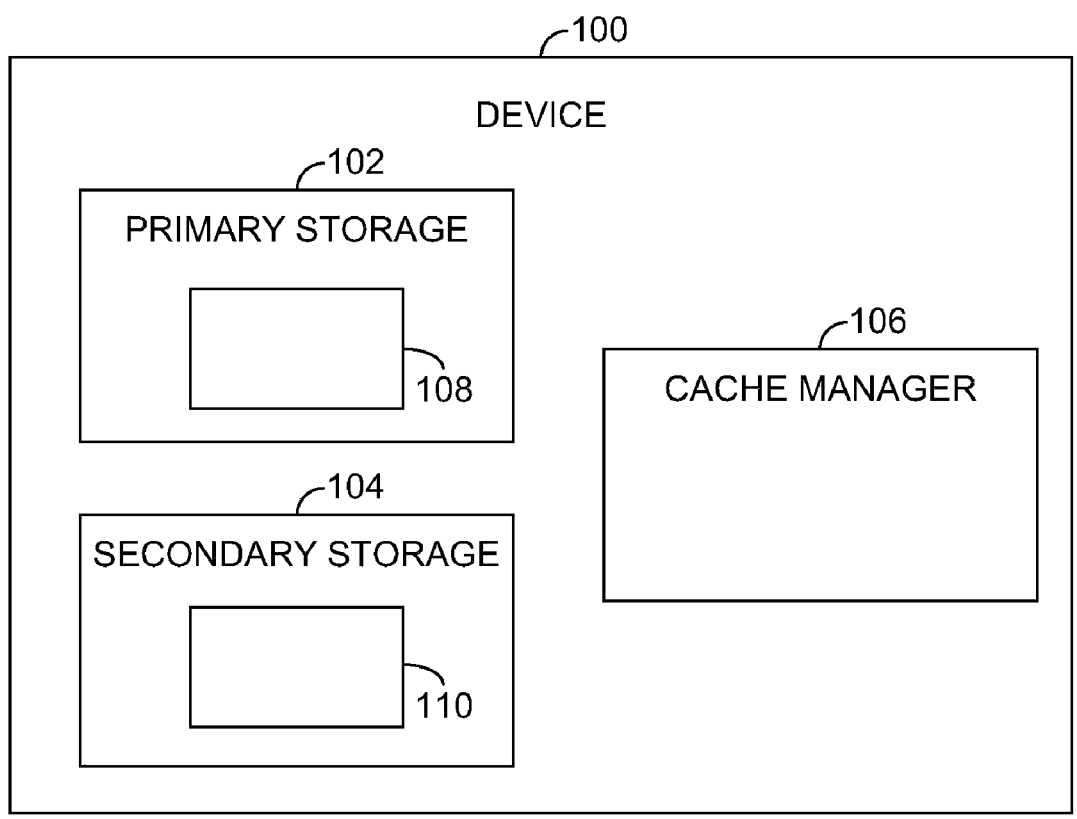
FIG. 1 is a block diagram of an exemplary device including a cache manager for managing the storage of web resources between a primary storage and secondary storage in accordance with an embodiment of the present invention.

Referring to FIG. 1, a block diagram is shown of an exemplary device 100 in which exemplary embodiments of the present invention may be employed. It should be understood that this and other arrangements described herein with are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

As shown in FIG. 1, device 100 may include, among other components not shown, a primary storage 102, a secondary storage 104, and a cache manager 106. In some embodiments, primary storage 102 may be a non-removable storage unit that may have a small data capacity but a fast read/write speed and is resident on device 100 such as non-removable memory. In some embodiments, secondary storage 104 may be a removable storage unit that may have a large data capacity but a slow read/write speed. In such embodiments, by way of example and not limitation, secondary storage 104 may be a Universal Serial Bus (USB) flash memory drive, a Secure Digital (SD) memory card, a Memory Stick, and/or any mass storage card. As a user browses web pages and associated web resources are downloaded onto device 100, cache manager 106 determines whether data should be stored in primary storage 102 or secondary storage 104. Cache manager 106 also determines whether resources stored in the secondary storage 104 should be moved to primary storage 102 based on anticipated need of the resource. In one embodiment, cache manager 106 may be a component of a browser application on the device 100.

The device 100 shown in FIG. 1 illustrates an exemplary device providing the capability for cache manager 106 to manage whether downloaded data is stored in primary storage 102 or secondary storage 104. In general, device 100 may be any type of personal computing device capable of allowing a user to browse the Internet and/or other network resources and having a memory or some other storage of a user's web browser cache. In some embodiments, by way of example and not limitation, device 100 may be a cellular phone, a personal digital assistant (PDA), and/or a laptop computer.

As noted above, in some embodiments, cache manager 106 determines whether a resource should be stored in secondary storage 104. For instance, as a user using device 100 browses a web page, web resources associated with the viewed web page are downloaded and stored in primary storage file 108 in primary storage 102. On an individual basis or by comparison with other downloaded web resources, cache manager 106 determines whether each of the web resources should be moved to secondary storage 104 based on a comparison of the amount of time required to download the web resource (download time) and the amount of time required to retrieve the web resource from secondary storage 104 (secondary storage retrieval time). For example, if a web resource takes a long time to download, but a relatively short time to retrieve from secondary storage 104, cache manager 106 may move the web resource from primary storage 102 to secondary storage 104.

In some embodiments, the amount of time required to retrieve a web resource from secondary storage 104 may be determined based on the throughput of secondary storage 104. Throughput, as referred to herein, is the average rate for which data may be read from a device and may be measured in, for instance, bits per second. Determining the amount of time required to retrieve a web resource from secondary storage 104 based on the throughput may take into consideration the size of the web resource.

If cache manager 106 determines that a web resource should be moved to secondary storage 104 based on a download time/secondary storage retrieval time comparison for the web resource, the web resource is stored in secondary storage file 110 in secondary storage 104 and deleted from primary storage file 108 in primary storage 102. In one embodiment, secondary storage file 110 is a string of all web resources stored therein. To protect the data stored in secondary storage file 110, cache manager 106 may store the location of each web resource within secondary storage file 110 in a separate file on device 100, which may be primary storage file 108.

In some embodiments, cache manager 106 may move a web resource from secondary storage 104 to primary storage 102. For instance, a user using device 100 browses a web page for which a web resource has been previously downloaded and stored in either primary storage 102 or secondary storage 104. Cache manager 106 determines that other web resources stored in secondary storage 104 have a likelihood of being utilized based on the web resources that have been previously downloaded in association with the web page to which the user is presently browsing. Cache manager 106 moves the web resources that are likely to be viewed from secondary storage 104 to primary storage 102 in anticipation of the web resources being utilized.

In one embodiment, whether a web resource has a likelihood of being utilized may be based on the order in which web resources were previously downloaded. For instance, if a user typically browses web pages in a certain order, and consequently downloads the associated web resources in a certain order, then the cache manager uses this information to move cached resources from secondary storage 104 to primary storage 102 in anticipation of the user visiting the web pages in that previously viewed order. In another embodiment, whether a web resource has a likelihood of being utilized may be based on a domain to which the user is presently browsing and the web resources associated with the domain that have been previously downloaded.

In some embodiments, cache manager 106 may take into consideration other factors when determining whether to store a web resource in primary storage 102 or secondary storage 104. For example, upon downloading a web resource, if there is not storage space available for the web resource in primary storage 102 or if the web resource is too large for primary storage 102, cache manager 106 may determine whether there is storage space available in secondary storage 104. If there is storage space available in secondary storage 104, cache manager 106 may store the web resource in secondary storage 104. If there is not storage space available in secondary storage 104, cache manager 106 may delete web resources from secondary storage 104 to make storage space available for the web resource. For example, web resources may be deleted from secondary storage 104 according to a first in, first out (FIFO) prioritization. Alternatively, web resources may be deleted from secondary storage 104 based on an associated download time/secondary storage retrieval time comparison for all of the web resources stored in secondary storage 104. In this example, a web resource stored in secondary storage 104 that requires less time to download may be deleted to make storage space available for a web resource that requires more time to download. Other factors may be taken into consideration when determining whether to delete resources from secondary storage 104 to make storage space available, such as the set expiration date for each of the stored web resources. Additionally, as primary storage 102 begins to fill up, cache manager 106 may manage web resources such that they are not purged prior to their set expiration date by moving the web resources to secondary storage 104. This allows cache manager 106 to create storage space in primary storage 102 for web resources that are likely to be utilized, while not purging a web resource prior to its set expiration date and requiring the web resource to be downloaded again if the user returns to the web page from which the web resource was acquired.

Figure 2:
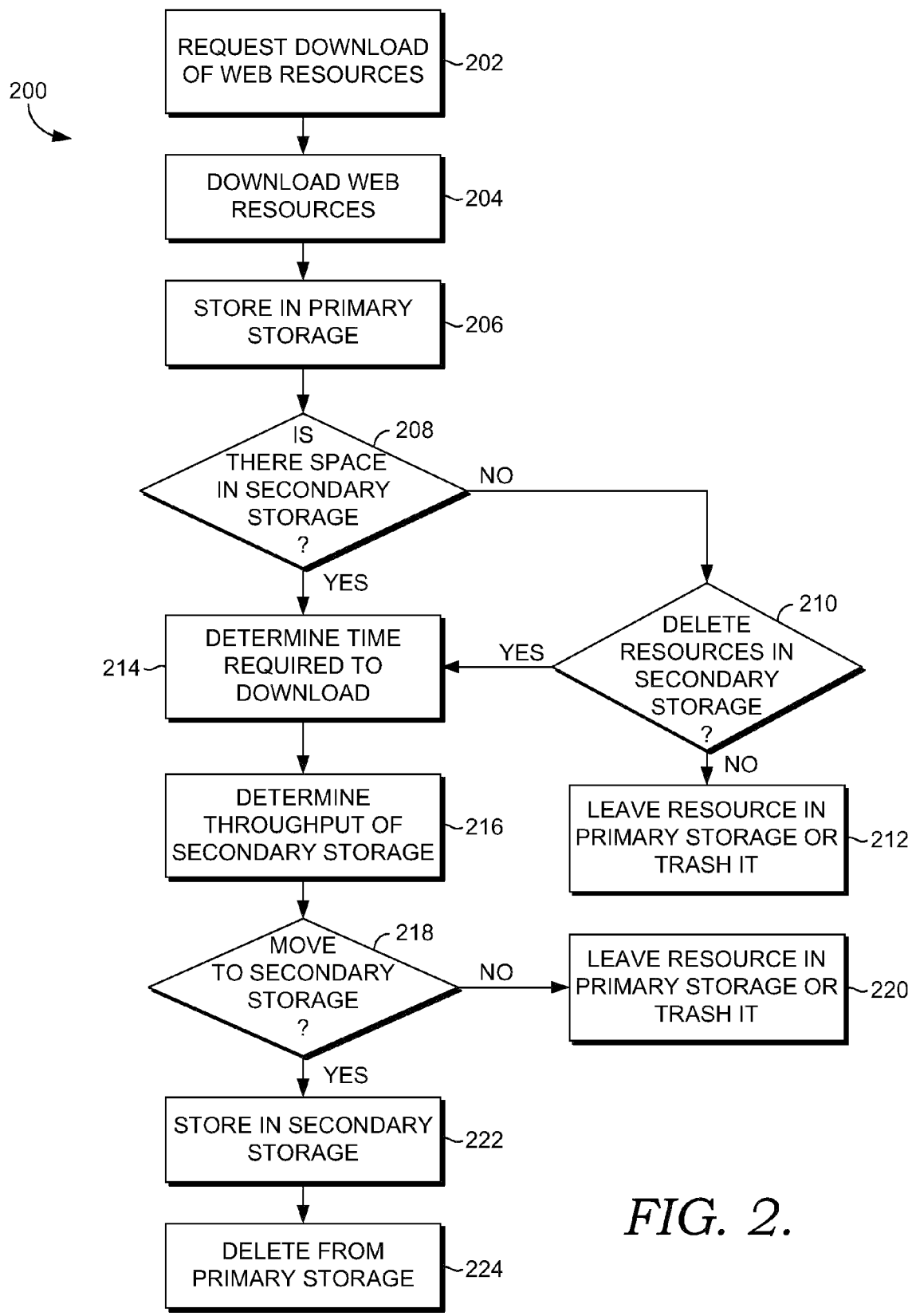
FIG. 2 is a flow diagram of an exemplary method for determining whether a web resource should be stored in a primary storage or a secondary storage based on a download time/secondary storage retrieval time comparison in accordance with an embodiment of the present invention.

Referring now to FIG. 2, a flow chart is provided illustrating a method 200 for determining whether a web resource should be stored in a primary storage or a secondary storage based on a download time/secondary storage retrieval time comparison. It should be noted that other methods could be employed without departing from the scope of the invention. In method 200, a user browsing a web page on a device downloads web resources from the viewed web page and the cache manager determines whether to store the web resources in a primary storage or a secondary storage. At 202, the method 200 includes requesting a web resource associated with a web page being viewed by a user to be downloaded onto the user's device. After receiving the download request, the method 200 downloads the web resource at 204. Next, the method 200 includes storing the downloaded web resource in the primary storage at 206. At decision block 208, the method 200 determines whether there is storage space available for a downloaded web resource in the secondary storage. If there is not storage space available in the secondary storage, at decision block 210, the method 200 determines whether to delete web resources stored in the secondary storage to make space available for the web resource. Web resources may be deleted from the secondary storage according to a FIFO prioritization. Alternatively, web resources may be deleted from the secondary storage based on an associated download time/secondary storage retrieval time comparison for all of the web resources stored in the secondary storage. In this example, a web resource stored in the secondary storage that requires less time to download may be deleted to make storage space available for a web resource that requires more time to download. Other factors may be taken into consideration when determining whether to delete resources from the secondary storage to make storage space available, such as the set expiration date for each of the stored web resources. If no web resources stored in secondary storage are deleted at 210, the method 200 determines whether to leave the web resource in the primary storage or to delete the web resource at 212. One of skill in the art will appreciate that the determination to leave the web resource in the primary storage or to delete the web resource may be based on present caching standards.

If it is determined at 208 that there is storage space available in the secondary storage or if at 210 web resources are deleted from the secondary storage to make storage space available, then the method 200 proceeds to 214 to determine the amount of time required to download the web resource. In one embodiment, determining the amount of time required to download a web resource may be accomplished by measuring the time between requesting the download of a web resource and completing the web resource download. At 216, the method 200 determines the amount of time required to retrieve data from the secondary storage. The amount of time required to retrieve data from the secondary storage may be determined based on the throughput of the secondary storage. Throughput, as referred to herein, is the average rate for which data may be read from a device and may be measured in bits per second. Determining the amount of time required to retrieve data from the secondary storage based on the throughput may take into consideration the size of a downloaded web resource. In one embodiment, the secondary storage may be a removable storage unit. As one of skill in the art will appreciate, the throughput of a device, such as a removable storage unit, may be a specified standard range for the device.

At block 218, method 200 determines whether the downloaded web resource should be moved to the secondary storage. In one embodiment, this determination is based on the amount of time required to retrieve data from the secondary storage determined at 216 being less than the amount of time required to download the web resource determined at 214. Similar to 212, if it is determined at 218 not to move the web resource to the secondary storage, the method 200 determines whether to leave the web resource in the primary storage or to delete the web resource at 220. Again, one of skill in the art will appreciate that the determination to leave the web resource in the primary storage or to delete the web resource may be based on present caching standards. However, if it is determined at 218 to move the web resource to the secondary storage, then the method proceeds to 222 where the web resource is stored in the secondary storage and deleted from the primary storage at 224.

In one exemplary embodiment, the secondary storage may be a removable storage unit. Further, the removable storage unit may contain a file for storing web resources. When a web resource is stored on the secondary storage, it may be appended to the file stored on the removable storage unit. The file stored on the removable storage unit may be a single string containing all of the web resources stored therein. The location of a particular web resource stored on the secondary storage is stored in a separate file on the device. This separate file may be located in the primary storage.

The method 200 determines whether a web resource should be stored in the primary storage or the secondary storage based on a comparison of the time required to acquire the web resource and the time required to retrieve the web resource from the secondary storage. Method 200 may take other factors into consideration when determining whether to store a web resource in the primary storage or the secondary storage. For example, upon downloading a web resource, if there is not storage space available for the web resource in the primary storage or if the web resource is too large for the primary storage, method 200 may determine whether there is storage space available in the secondary storage. If there is storage space available in the secondary storage and the time required to retrieve data from the secondary storage is less than the time required to acquire the web resource, method 200 may store the web resource in the secondary storage.

Figure 3:
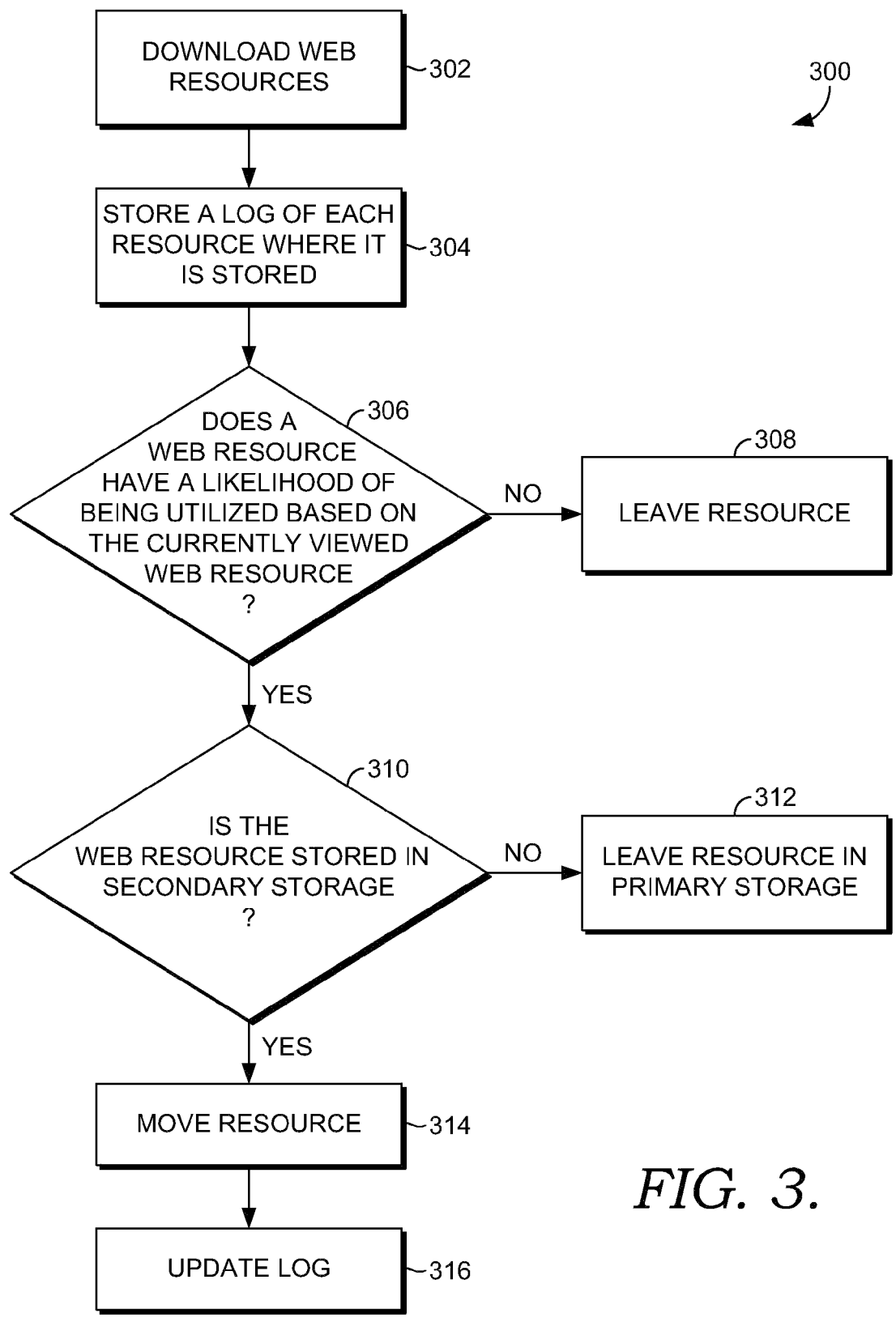
FIG. 3 is a flow diagram of an exemplary method for moving a web resource from a secondary storage to a primary storage based on determining that the web resource has a likelihood of being utilized in accordance with an embodiment of the present invention.

Turning to FIG. 3, a flow diagram is provided illustrating an exemplary method 300 for moving a web resource from a secondary storage to a primary storage based on determining that the web resource has a likelihood of being utilized according to one embodiment of the present invention. At 302, the method 300 downloads web resources from a web page to which a user is presently browsing. After web resources are downloaded, they may be moved from the primary storage to the secondary storage in a manner such as method 200 discussed with reference to FIG. 2. As the web resources are downloaded and stored, at 304 the method 300 maintains a log of each web resource and where the web resource is stored, such as the primary storage or the secondary storage. As the user continues browsing web pages, at block 306, method 300 determines whether a web resource has a likelihood of being utilized based on the web resource that the user is currently viewing. In one embodiment, whether a web resource has a likelihood of being utilized may be based on the order in which web resources were previously downloaded. For instance, if a user typically browses web pages in a certain order, and consequently downloads the associated web resources in a certain order, this information may be used to move cached resources from the secondary storage to the primary storage in anticipation of the user visiting the web pages in that previously viewed order. In another embodiment, whether a web resource has a likelihood of being utilized may be based on a domain to which the user is presently browsing and the web resources associated with the domain that were previously downloaded. If it is determined at 306 that a web resource does not have a likelihood of being utilized, the web resource is left in its current storage location at 308.

If it is determined at 306 that the web resource has a likelihood of being utilized, the method 300 determines whether the web resource is stored in the secondary storage at block 310. In one embodiment, the method 300 uses the log to determine whether the web resource is stored in secondary storage. If it is determined at 310 that the web resource is not in the secondary storage, the web resource is left in the primary storage at 312. However, if it is determined at 310 that the web resource is stored in the secondary storage, the method 300 moves the web resource from secondary storage to the primary storage at 314. At 316, the method 300 updates the log with the new location of the web resource. In one embodiment, only web resources stored in the secondary storage may be assessed for a likelihood of being utilized, in which case steps 310 and 312 may be omitted.

The method 300 anticipates whether a user is likely to use a web resource that is stored in the secondary storage based on the previously downloaded web resources so that it may move the web resources from the secondary storage to the primary storage. For instance, if a user typically browses web pages in a certain order, and consequently downloads the associated web resources in a certain order, then the cache manager uses this information to move cached resources from the secondary storage to the primary storage in anticipation of the user visiting the web pages in that previously viewed order. As one of skill in the art will appreciate, current caching standards may be used in conjunction with the present invention. For example, the method 300 of the present invention may respect set expiration dates of web resources such that they are purged on or before their set expiration date from the storage unit within which they are stored, regardless of whether they have a likelihood of being utilized.

Additionally, as web resources are moved from the secondary storage to the primary storage based on their likelihood of being utilized and the primary storage begins to fill up, method 300 may manage web resources such that they are not purged prior to their set expiration date. For example, a web resource that has a set expiration date may be stored in the primary storage. As it gets closer to the expiration date of the web resource and the web resource has not been utilized, method 300 may move the web resource to the secondary storage. This allows the method to create storage space in the primary storage for web resources that are likely to be utilized, while not purging a web resource prior to its set expiration date and requiring the web resource to be downloaded again if the user returns to the web page from which the web resource was acquired. Moving the web resource to the secondary storage may take into consideration the download time/secondary storage retrieval time comparison. Further, the amount of time required to download a web resource, the amount of time required to retrieve the web resource from the secondary storage, and the throughput of the secondary storage values may be stored in the log. When a web resource is moved from one storage to another, the log may be updated with the current location of the web resource.

Many different arrangements of the various components depicted, as well as components not shown, are possible without departing from the spirit and scope of the present invention. Embodiments of the present invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for managing cache between a primary storage and a secondary storage on a device, the method comprising:
    moving a first web resource stored in the primary storage to the secondary storage, based on a comparison between
        (A) an amount of time required to download the first web resource, and
        (B) an amount of time required to retrieve the first web resource from the secondary storage; and
    deleting a second web resource stored in the secondary storage, based on a comparison between
        (A) an amount of time required to download the second web resource, and
        (B) an amount of time required to download the first web resource.

2. The method of claim 1, further comprising moving a third web resource from the secondary storage to the primary storage based on a likelihood that the third web resource will be utilized.

3. The method of claim 1, wherein the first web resource is moved to the secondary storage when the amount of time required to retrieve the first web resource from the secondary storage is less than the amount of time required to download the first web resource.

4. The method of claim 1, wherein the second web resource is deleted when the amount of time required to download the second web resource is less than the amount of time required to download the first web resource.

5. The method of claim 1, wherein the device is a mobile device.

6. The method of claim 1, wherein the primary storage is memory resident on the device.

7. The method of claim 1, wherein the secondary storage is a removable storage unit.

8. The method of claim 7, wherein moving the first web resource to the secondary storage comprises:
 writing the first web resource to a first file on the removable storage unit;
 storing the location of the web resource in the first file to a second file on the device; and
 wherein the first file on the removable storage unit is a string of a plurality of web resources that are stored on the removable storage unit.

9. The method of claim 1, wherein moving the first web resource to the secondary storage comprises deleting the first web resource from the primary storage.

10. The method of claim 1, wherein the amount of time required to download the first web resource is determined at least by measuring a time between requesting to download the first web resource and a completed download of the first web resource.

11. One or more computer-storage media having computer-usable instructions embodied thereon that, when executed, perform a method for managing cache between a primary storage and a secondary storage on a mobile device, the method comprising:
 selecting a first web resource to be deleted from the primary storage;
 determining whether storage space is available in the secondary storage for the first web resource;
 when storage space is available in the secondary storage, then storing the first web resource in the secondary storage;
 when storage space is not available in the secondary storage, then
  (A) deleting a second web resource from the secondary storage to make storage space available in the secondary storage for the first web resource, and
  (B) storing the first web resource in the secondary storage;
 deleting the first web resource from the primary storage.

12. The method of claim 11, wherein the second web resource is selected to be deleted based on at least one of,
 (A) a FIFO prioritization,
 (B) a comparison between an amount of time required to download the second web resource and an amount of time required to retrieve the second web resource from the secondary storage, or
 (C) an expiration date of the second web resource.

13. The media of claim 11, further comprising determining that there is storage space available on the secondary storage for each of a plurality of web resources in the primary storage.

14. The method of claim 12, wherein the amount of time required to download the second web resource is determined at least by measuring a time between requesting to download the second web resource and a completed download of the second web resource.

15. The media of claim 11, wherein the secondary storage is a removable storage unit.

16. A method for managing cache between a primary storage and a secondary storage on a mobile device, the method comprising:
 determining whether a first web resource stored in the secondary storage has a likelihood of being utilized;
 when the first web resource has a likelihood of being utilized, then moving the first web resource from the secondary storage to the primary storage;
 preventing the primary storage from filling up by removing a second web resource from the primary storage, wherein removing the second web resource includes,
  (A) determining whether the second web resource has expired,
  (B) when the second web resource has expired, then deleting the second web resource, and
  (C) when the second web resource has not expired, then moving the second web resource to the secondary storage.

17. The method of claim 16, further comprising updating a log to indicate that the first web resource is in the primary storage.

18. The method of claim 16, further comprising updating a log to indicate that the second web resource is in the secondary storage.

19. The method of claim 16, wherein determining whether the first web resource has a likelihood of being utilized is based at least on a domain to which the user is currently browsing and web resources associated with the domain that have been previously downloaded.

20. The method of claim 16, wherein determining that a web resource has a likelihood of being utilized is based at least on an order in which a plurality of web resources were previously downloaded.

* * * * *